Nov. 20, 1956     F. H. FRANTZ ET AL     2,770,976

VARIABLE SPEED DRIVE MECHANISM

Filed Aug. 29, 1955

INVENTOR
FREDERICK H. FRANTZ
WERNER O. SCHINK
BY
ATTORNEYS

United States Patent Office 2,770,976
Patented Nov. 20, 1956

2,770,976
VARIABLE SPEED DRIVE MECHANISM

Frederick H. Frantz, Binghamton, and Werner O. Schink, Johnson City, N. Y., assignors to General Aniline & Film Corporation, New York, N. Y., a corporation of Delaware Application August 29, 1955, Serial No. 531,163

3 Claims. (Cl. 74—194)

This invention relates to power transmitting mechanisms and more particularly to variable speed drives of the friction disk type.

Drives utilizing a friction disk and contacting wheel which may be positioned along the radial surface of the disk have been used in various forms. In order to transmit appreciable power in such drives, it is necessary to maintain a firm contact between the disk and the driven wheel. This requires springs or other devices and has the drawback that a tight coupling is also maintained when the power requirement is low, thus wasting energy due to the strong frictional contact.

It is the principal feature of this invention that the frictional contact between the disk and the wheel is automatically increased as the load increases and the power transfer becomes greater.

It is also an object of this invention to provide a variable speed friction disk power drive requiring no springs or other means for maintaining contact between the driving and the driven elements.

Figure 1:
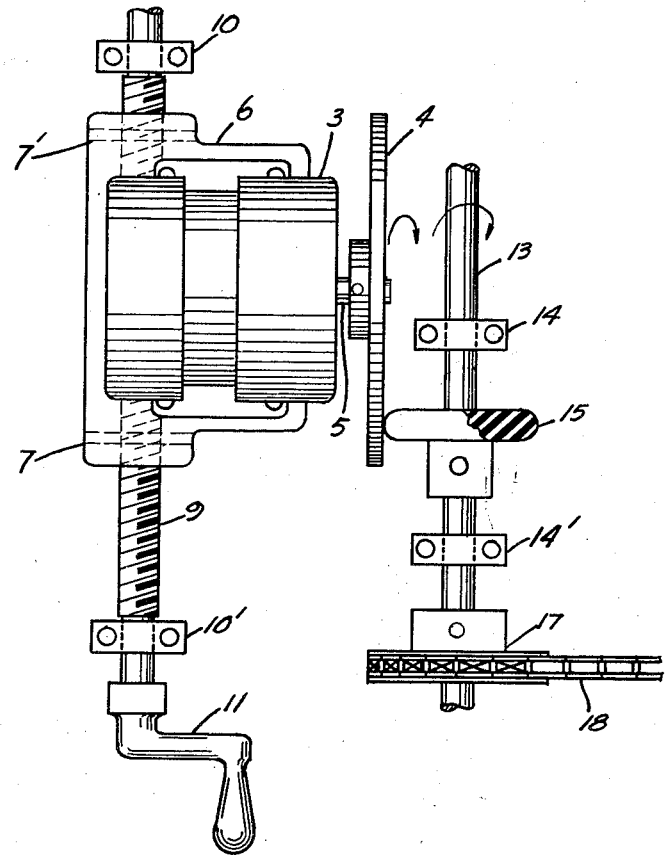
Figure 2:
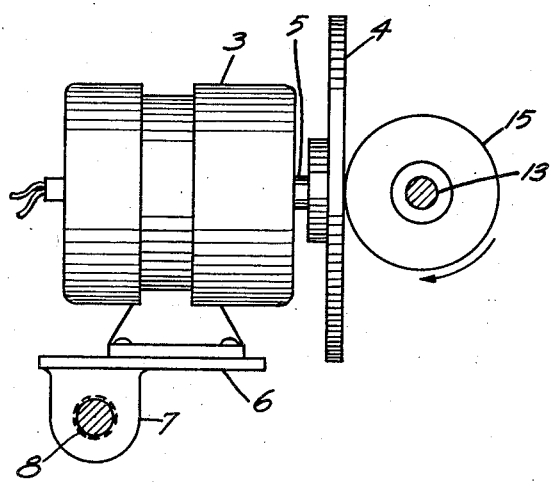

Other objects and features will be apparent from the following description of the invention, pointed out in particularity in the appended claims and taken in connection with the accompanying drawing in which:

Fig. 1 is a top view of the drive mechanism; and
Fig. 2 is a side view thereof.

Referring to the figures, the drive motor 3 has a friction disk 4 attached to the shaft 5. The motor 3 is mounted on a platform bracket 6 which has downwardly extending lugs 7 and 7' having female threads 8 which accommodate the lead screw 9 journalled in bearings 10 and 10' and equipped with a handle 11.

The driven element comprises the shaft 13 extending in parallel with the lead screw 9 and journalled in bearings 14 and 14'. Affixed to the shaft 13 is the driven wheel 15. At the end of the shaft 13 there is shown, by way of example, a power transfer means in the form of a sprocket 17 carrying the chain 18.

As can be seen from the figures, the motor 3 is free to pivot in a direction perpendicular to the shaft 13 on the lead screw 9 so that the weight of the motor 3 will establish contact between the disk 4 and the driven wheel 15.

Since the platform bracket lugs 7 are threaded, turning the handle 11 will cause the motor 3 to move in a direction axial to the shaft 13 whereby the contact between disk 4 and the wheel 15 may be located anywhere from the center of the disk 4 to the periphery thereof in order to control the speed of the driven wheel.

It is important to note that, in accordance with the invention, the direction of rotation of the disk 4, as indicated by the arrow, is so chosen that the rotation of the driven wheel is in the direction opposite to the pivotal movement of the motor 3. Under such conditions, as the load on the chain 18 increases, a force is produced between the disk 4 and the wheel 15 due to the rotational movement which will tend to move the motor 3 downwardly in the direction of its pivotal swing. This force thereby increases the frictional contact between the driving and driven elements. A reverse direction of rotation of the motor, on the other hand, would tend to lift the disk 4 from engagement with the wheel 15.

In practice, the driven wheel 15 is preferably of resilient material such as rubber, or is equipped with a rubber tire.

The disk 4 is so adjusted on the shaft 3 that maximum downward thrust of the motor 3 on the shaft 5 will not permit the driven wheel 15 to contact the disk much above its center line. In other words, under no-load conditions, the motor may assume a position at a small angle above the horizontal. As the load increases, the disk 4 will tend to ride on the wheel 15 forcing itself downwardly and thereby increasing the frictional hold, whereas, when the load decreases, the elasticity of the wheel 15 will restore the motor 4 to normal position.

While a preferred embodiment according to the present invention has been illustrated and described, it is understood that various modifications may be resorted to without departing from the spirit and scope of the appended claims.

We claim:

1. A variable speed friction drive including a motor having a shaft and a friction disk attached to the front end thereof, means for suspending said motor for pivotal movement in a direction perpendicular to said shaft and for displacement in a direction horizontal thereto, a driven wheel frictionally engaging said disk by virtue of the weight and pivotal movement of said motor, a driven shaft keyed to said wheel and extending in a direction parallel to the displacement of said motor whereby upon said displacement the position of said wheel may be altered along the radius of said disk for varying the speed of said driven shaft, the direction of rotation of said disk being such as to produce a force tending to move said motor on said pivotal support toward engagement with said wheel, thereby increasing the frictional contact therewith.

2. A variable speed friction drive in accordance with claim 1 wherein said means for suspending said motor comprises a platform bracket having a threaded portion and said means for displacement of said motor comprising a lead screw extending in a direction parallel to said driven shaft and journalled for rotation upon which said threaded portion travels and manual means for turning said lead screw.

3. A variable speed friction drive in accordance with claim 1 wherein said wheel has a resilient rim in contact with said disk for yielding to said force tending to move said motor on its pivotal suspension.

References Cited in the file of this patent

UNITED STATES PATENTS

| 1,397,296 | Schaf | Nov. 15, 1921 |
| 2,665,591 | Casselman | Jan. 12, 1954 |

FOREIGN PATENTS

| 278,946 | Italy | Oct. 24, 1930 |